Jan. 15, 1935.  D. GORDON  1,987,821
OPTICAL SYSTEM AND MEANS USED THEREIN
Filed Jan. 13, 1932  4 Sheets-Sheet 2
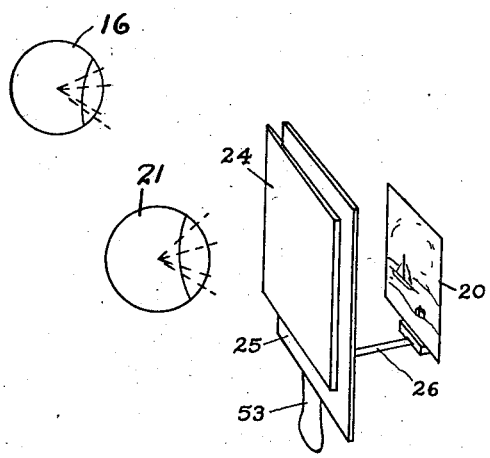
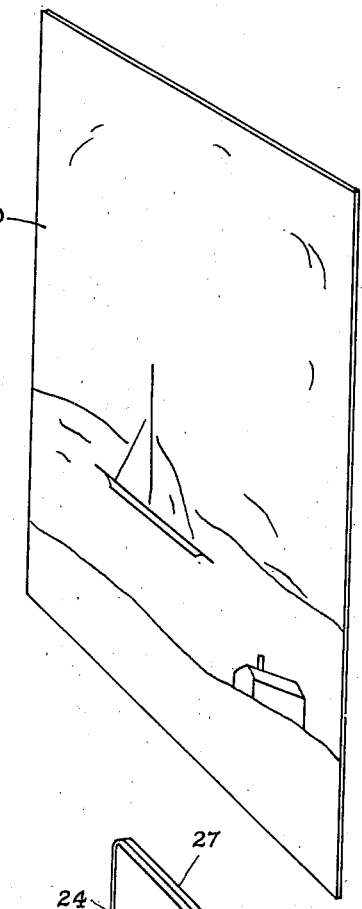
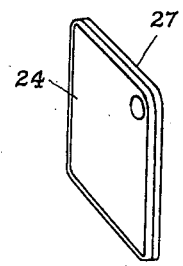
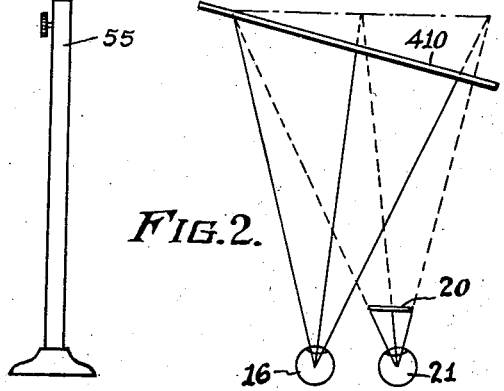
INVENTOR
David Gordon
ATTORNEY Jan. 15, 1935.  D. GORDON  1,987,821
OPTICAL SYSTEM AND MEANS USED THEREIN
Filed Jan. 13, 1932  4 Sheets-Sheet 3

Jan. 15, 1935. D. GORDON 1,987,821
OPTICAL SYSTEM AND MEANS USED THEREIN
Filed Jan. 13, 1932 4 Sheets-Sheet 4

INVENTOR
David Gordon
ATTORNEY

Patented Jan. 15, 1935

1,987,821

UNITED STATES PATENT OFFICE 1,987,821

OPTICAL SYSTEM AND MEANS USED THEREIN

David Gordon, Bridgeport, Conn., assignor of one-third to Nathan Gordon, Bridgeport, Conn.

Application January 13, 1932, Serial No. 586,262

9 Claims. (Cl. 88—29)

This invention relates to means for producing optical effects having natural depth or any depth which may be determined or desired.

An object of the present invention is to provide means for producing optical effects having natural depth or any depth which may be predetermined or desired.

A further object of this invention is to produce these effects in such a way that in obtaining them the eyes of the observer have their lines of vision converging toward substantially the same point of the view, whether natural such as a landscape, or artificial such as a photograph, drawing or painting. This is a particularly important feature of the present invention, for it avoids the unnatural straight-ahead vision of each individual eye which is present in the ordinary stereoscope and which produces a strain on the eyes.

A further object of this invention is to provide means whereby phantom or illusionary effects may be obtained by causing one part of the subject to be viewed with one eye and another part to be viewed with the other eye. In this way, when the same part of the subject is viewed with both eyes the exterior of a device might be viewed. When the other part of the subject is viewed with both eyes the interior of the subject may be viewed, but when both parts are viewed together or one part with each eye, the exterior and interior are superposed, thus giving a phantom effect.

Further, according to the present invention, the part of the subject which is viewed with one eye may be movable relative to that which is viewed with the other eye and when moved gives the effect of movement occurring in the subject.

These and other objects are obtained by the present invention by the provision of a picture or view supplemental to and smaller than the main picture or view and placing this supplemental picture in the line of vision of one of the eyes of the observer which it follows when the lines of vision of both eyes converge upon the main view.

According to the present invention, the main view may be a natural scene or it may be a photograph, drawing or painting; or, it may be a moving picture. The supplemental view will usually be a drawing, painting or photograph, although in case the main view is a moving picture, the supplemental view may be formed by a supplemental moving picture carried by reflection or refraction, as happens to be most desirable, to the line of vision of the one eye while the lines of vision of both eyes are converged toward the main view.

Even when the supplemental view is formed by a photograph, drawing, or painting, it may be located outside the normal line of vision of the eyes, and it may be brought into the line of vision of the one eye by reflection or refraction.

Other features and advantages will hereinafter appear.

In the accompanying drawings which illustrate several embodiments of this invention—

Fig. 2 is also a diagrammatic view, but shows the main view from a mirror tilted at an angle and reflecting an object in life.

Fig. 3 is a perspective view of the main scene, the supplemental scene, and the means for holding the latter, including a lens along with the diagrammatic indications of the eyeballs of the observer.

Fig. 4 shows a supplemental view for a portraiture.

Fig. 5 shows a support for the supplemental view holder.

Fig. 6 shows a compound lens which may be used with the supplemental view holder.

As above indicated, the present invention gives various optical effects by superimposing a view seen with one eye upon another view seen with the other eye, and this is done so that the lines of vision of the two eyes converge as is natural upon one of the views.

Figure 1:
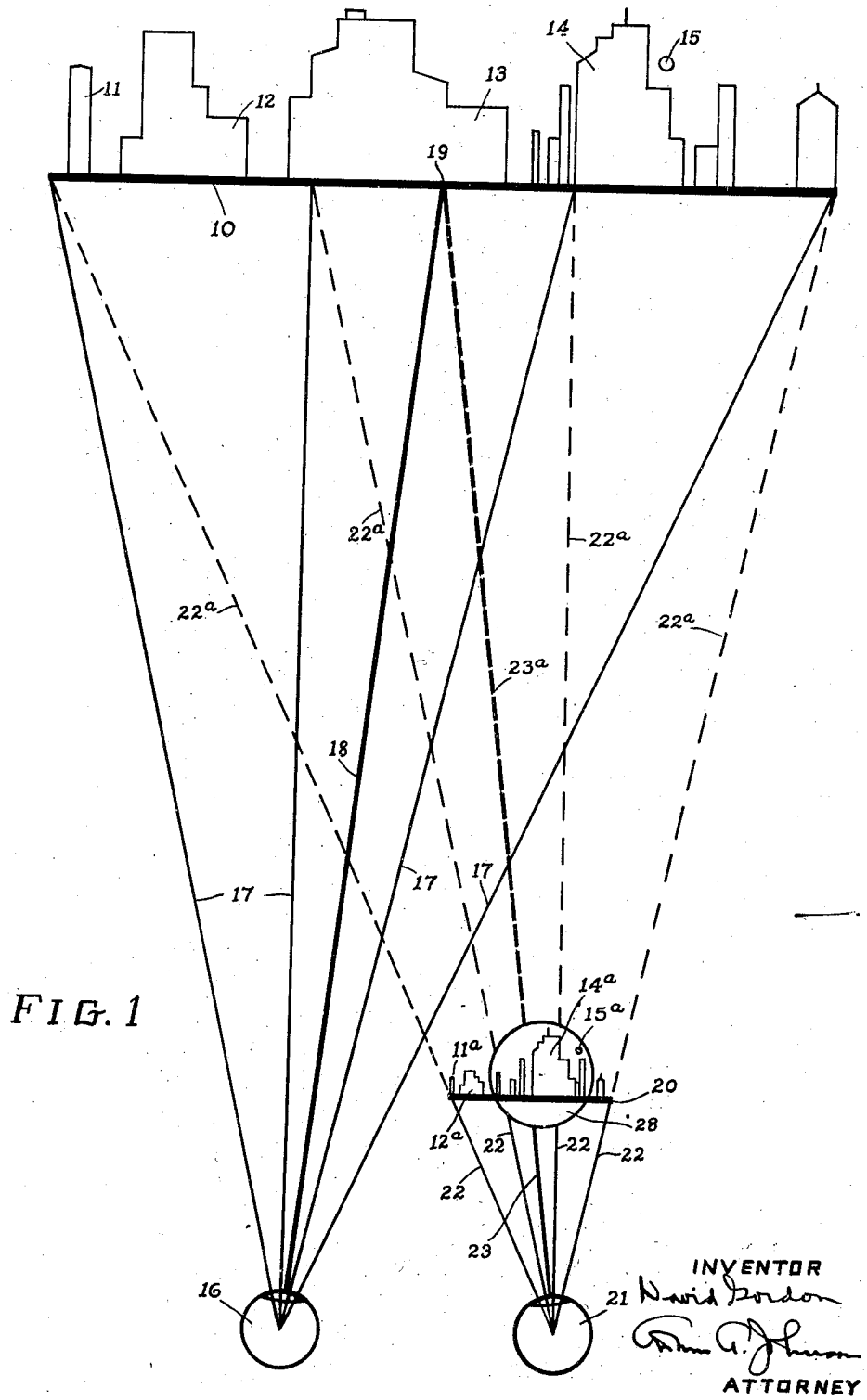
Figure 1 is a diagrammatic view showing the relation of the main view to the supplemental view, a portion of the latter being enlarged.

As indicated in Fig. 1, the main view 10 is a picture such as a drawing, painting, or photograph, or a natural life scene the lines of which are projected above the paper to indicate objects 11, 12, 13, 14 and 15. It is in the field of vision of the left eye 16 as indicated by the lines of vision 17 and a central line of vision 18 which is focused at the center 19 of the picture. The supplemental picture is represented at 20 and has drawn above it the objects shown in the main view. These are indicated by the same reference numerals as in the main view to which the exponent $a$ has been added. The picture 20 is located in the field of vision of the right eye 21, the lines of vision of which are indicated by reference numeral 22, the central line of vision being indicated by reference numeral 23. The picture 20 is preferably so located in the field of vision of the eye 21 that the central line of vision 23, when extended by the line 23a, converges upon the center 19 of the main picture 10 but may be offset in either direction somewhat without unduly straining of the eyes, and it is located so close to the eye 21 as to prevent the main picture 10 from being seen with that eye. Likewise, the outside and intermediary lines of vision 22 when extended, as by the dash lines 22a, join with the lines of vision 17 from the left eye at the picture 10.

The supplementary picture 20 is on a much smaller scale than the picture 10 so that it will appear to the right eye as large as the main picture 10 appears to the left eye. However, since it must be so small as to prevent its blocking-out any part of the field of vision of the left eye 16 in which the picture 10 is located, the supplementary picture 20 is usually on a still smaller scale and is enlarged by a lens, such as a lens 24, see Fig. 3, which, for convenience, may be mounted in a holder 25 having a support 26 for the supplementary picture 20. Of course, if greater magnification is required, the arrangement shown in Fig. 6 may be employed where there is an auxiliary lens 27, and this may be adjustably connected to the main lenses in any suitable way.

Referring again to Fig. 1, the diagrammatic indications of part of the objects have been magnified—the part within the circle 28 representing a view seen through a magnifying glass.

Of course, if the picture 20 were a direct duplication of the picture 10, no illusion indicating depth, that is stereoscopic effect, would be obtained and while in the broader aspects of this invention such stereoscopic effect is not necessary, its production is one of the salient features of this invention.

When the picture 10 of Fig. 1 is a drawing or painting, the picture 20 will also be a drawing or painting, and the latter is, according to the present invention, so made as to show relative depth between the objects 10, 11, 12, 13, 14, etc. of the picture.

This is accomplished by tracing from the main picture the parts thereof which lie in approximately the same place; then shifting the main picture and tracing the parts which lie in a different plane and so on shifting the picture relative to the tracing for each different plane of the objects in the picture.

The amount of shifting between the main picture and the tracing depends upon two factors—one being the width of the main picture itself and the other being the relative amount of depth desired to be indicated between the various objects or parts of objects in the picture.

In making the supplementary picture 20, if both pictures are drawings, the lateral offset between objects of different depths may be calculated to give a true stereoscopic effect. However, it is by properly proportioning the amount of offset that an illusion of any desired depth may be produced.

If the main picture is a natural scene or landscape, the supplemental picture may be made by means of a drawing or painting, but it is preferably made by photography, in which case a photograph is taken of the natural scene more or less to one side of the position from which the scene is intended to be viewed, depending on the distance between the scene and the observation point. This photograph is reduced to the desired proportion to constitute the supplemental picture.

If the main picture is a photograph of a landscape or natural scene, the supplemental picture may be likewise produced. For this purpose a stereoscopic camera may be employed.

Figure 7:
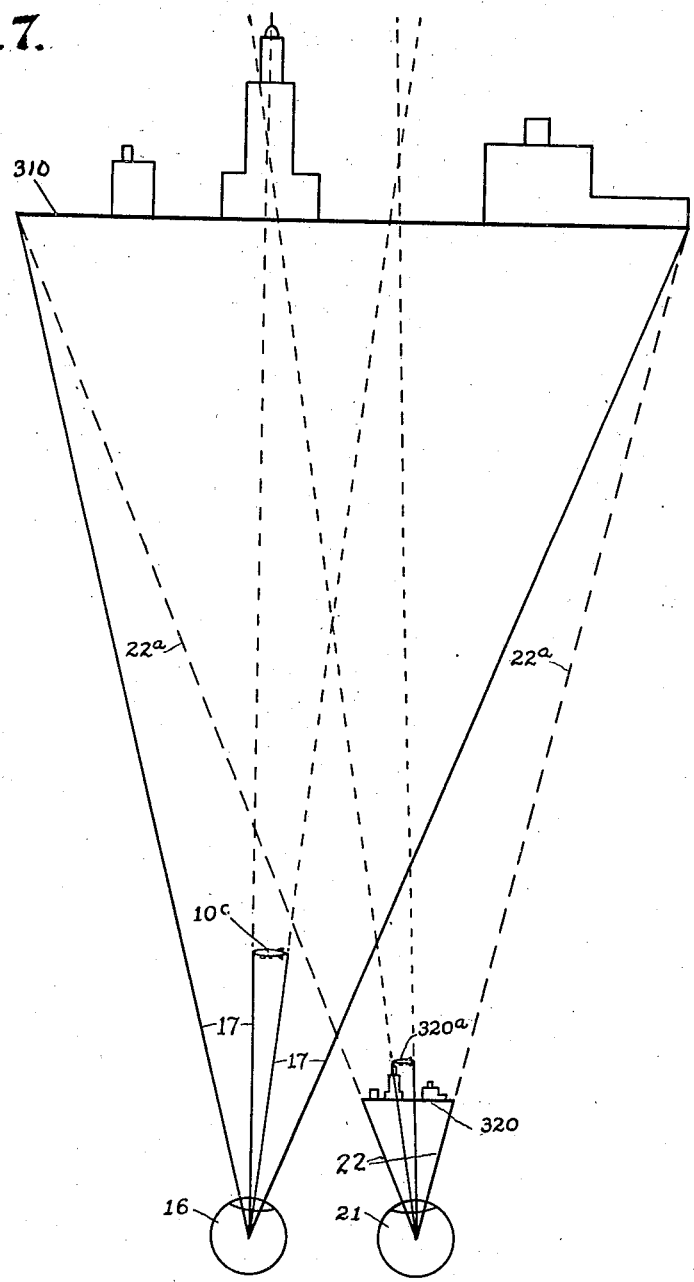
Fig. 7 is a diagrammatic view showing how one view may be superposed on another so as to show depth of the superposed object.

The present invention lends itself well to the production of illusions wherein both the main subject and a superimposed subject are shown in depth. This is illustrated in Fig. 7 in which the main picture may be a natural scene but, as illustrated, is a photograph or drawing 310 thereof—the objects being projected up for purposes of illustration and description—one of the objects being a tower. To give the impression of depth when this scene is viewed from a distance, a photograph is made of the scene from a point slightly to the side of the point at which it is to be observed. This is reduced to make a supplemental picture 320. The object to be superposed on the main scene is then photographed and another photograph taken from a laterally offset point is taken of the subject to be superposed. The latter is then reduced to the desired scale and is applied to the supplemental photograph 320. In Fig. 7, the object to be superimposed is represented as an airship and the photograph thereof applied to the supplemental picture 320 is represented by the reference numeral 320a. The companion picture to the supplemental superimposed picture 320a is enlarged or reduced to proper scale and is placed in the line of vision 17 of the left eye 16—this picture being indicated by the reference numeral 10c. Thus, when the supplemental picture 320 is held in front of the right eye 21 while the picture 10c is located in the lines of vision of the left eye, if the main scene or picture 10c is viewed from the designated observation point, not only will there be an illusion of the airship being moored to the tower in the main scene but both the tower and adjacent buildings and the airship will be shown in proper depth.

Upon reference to Figs. 1 and 7, it will be observed that there is natural convergence of the lines of vision. Yet, as herein described, an illusion of depth or stereoscopic effect is produced, and the strain on the eyes which results from looking at two separate laterally spaced pictures, as has been common heretofore in stereoscopes, is avoided.

Figure 8:
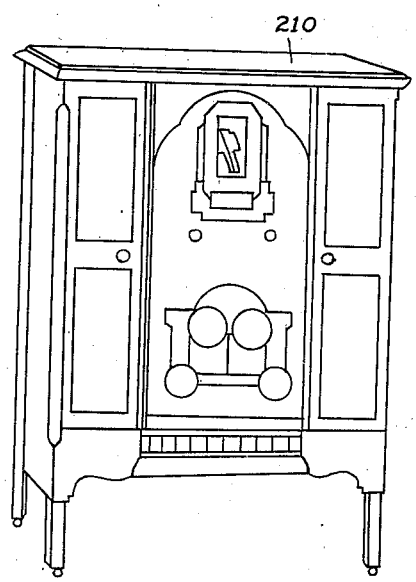
Fig. 8 shows a picture of a radio.
Figure 9:
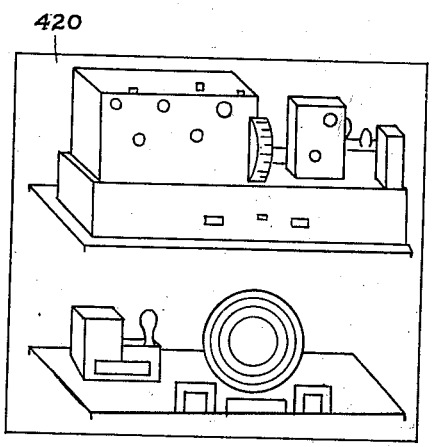
Fig. 9 is an enlarged view of the supplemental view used with the view shown in Fig. 8, and showing the interior of the radio which when used according to the present invention becomes superimposed upon the view shown in Fig. 8.

While giving an illusion of depth to produce the stereoscope effect is one of the main objects of this invention, the latter is not however, illustrated in all its aspects to this arrangement. For instance, the main view 210 shown in Fig. 8 may be either a drawing or photograph of an object to be viewed, for instance a radio cabinet shown or it may be a radio cabinet in life while the supplemental picture 420 shown in Fig. 9 is a drawing or photograph of the equipment or interior of the radio. Thus, when viewed with two eyes, the picture 210 shows the exterior of the radio. When viewed with two eyes the picture 420 shows the interior of the radio, but, when each is viewed with one eye, the picture 420 being reflected to the vision of the right eye 21, for instance by a mirror 52 or by the prism 51, or when reduced and actually placed in the line of vision of the right eye as in Figs. 1 and 7, the picture 420 becomes superposed on the picture 210, thus giving a skeleton or phantom view of the radio cabinet with the interior mechanism. This arrangement may be put to many practical uses in advertising or may be used educationally.

Figure 10:
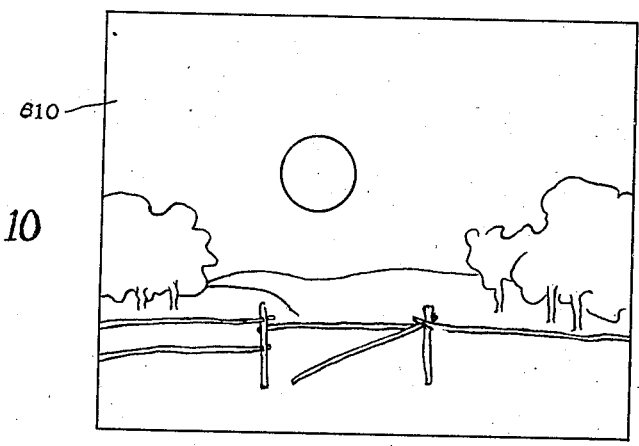
Fig. 10 shows a landscape to form a main picture.

Again, the supplemental picture may be so arranged as to be intentionally moved with relation to the main picture to give an illusion of motion occurring in the scene. For instance, as shown in Fig. 10, the main view 610 represents a pasture with the moon in prominent central position.

Figure 11:
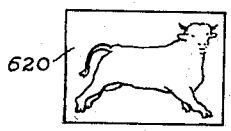
Fig. 11 is the supplemental view constituting the object to be superposed on the view shown in Fig. 10, so that when moved the object moves with relation to the main view shown in Fig. 10.

The supplemental picture 620 shown in Fig. 11, represents a cow in jumping position. With the supplemental picture 620 mounted in a holder, for instance such as the holder 24—25—26 in Fig. 3, the picture of the cow will appear superimposed on the main view 610. Movement of the holder and supplemental view 620 at this time will give the illusion of the cow jumping over the moon. This feature of the present invention lends itself well for use as an amusement device for children.

Of course, the holder 24—25—26 may be held in the hand of the observer, but it is preferable that it be rigidly supported on some stationary object. Accordingly, the holder is provided with a socket containing a handle 53 adapted to be received by a post 54 which is preferably telescopically mounted in a base 55.

It is also within the purview of this invention to reflect the main picture to the eye which views it directly—this being the left eye 16. As shown in Fig. 2, a mirror 410 is substituted for the main picture 10 and this may be used to reflect any object or picture to the left eye 16 while the right eye 21 views the supplemental picture 20, and produces the appearance of depth.

In applying the invention to portraitures or pictures of a single object, substantially the same principles as above described apply.

Variations and modifications may be made within the scope of this invention and portions of the improvements may be used without others.

Having thus described the invention, what is claimed as new and for which it is desired to obtain Letters Patent, is:—

1. In an optical system, a main picture substantially remote from the observer; a complementary picture; and means for supporting said complementary picture relatively close to the observer in the line of vision of one eye of the observer while the lines of vision of both eyes are in such directions that when extended they converge upon the main picture and producing with the main picture an illusionary effect, the objects of the complementary picture being offset with respect to those of the main picture so as to give an illusionary effect of depth.

2. In an optical system, a main picture substantially remote from the observer; a complementary picture, and means for supporting said complementary picture relatively close to the observer in the line of vision of one eye of the observer while the lines of vision of both eyes are in such directions that when extended they converge upon the main picture and producing with the main picture an illusionary effect, said complementary picture being so positioned relative to the eyes of the observer and the main picture as to block out the main picture from the view of the eye in whose line of vision it is placed, said complementary picture visually registering with the main picture and being of a proportion corresponding with the image which the main picture would produce at a distance from the observer's eye equal to which the complementary picture is located.

3. In an optical system, a main picture substantially remote from the observer, a complementary picture; and means for supporting said complementary picture relatively close to the observer in the line of vision of one eye of the observer while the lines of vision of both eyes are in such directions that when extended they converge upon the main picture and producing with the main picture an illusionary effect, said complementary picture being of such proportions and being so positioned relative to the eyes of the observer and the main picture as to block out the main picture from the view of the eye in whose line of vision it is placed and not to block out from the view of the other eye any portion of the main picture.

4. In an optical system, a main natural scene, a picture complementary to the main scene and showing the scene as it would be viewed from an optically offset position, and means supporting said picture relatively close to the observer in the line of vision of one eye of the observer while the lines of vision of both eyes are in such directions that when extended they converge upon the main scene, said pictures bringing out in relief the natural depth of the scene.

5. In an optical system, a main view showing an exterior of an object; a supplemental view showing an interior of the same object; and means for supporting said supplemental view in the line of vision of one eye of the observer while the lines of vision of both eyes are in such directions that when extended they converge upon the main view and producing with the main view a phantom effect, the main and supplemental views when observed alone showing the exterior and interior of one and the same object respectively.

6. In an optical system, a main view, and a supplemental picture showing an object related to but not shown on the main view; and means for supporting said supplemental picture in the line of vision of one eye of the observer while the lines of vision of both eyes are in such directions that when extended they converge upon the main view and produce the effect of the supplemental picture being superposed thereon, said supplemental picture and main picture being structurally separate and independently supported to be relatively movable and giving the appearance of movement of the supplemental object relative to the main view.

7. In an optical system, a main view, a supplemental picture showing an object related to but not shown on the main view; and means for supporting said supplemental picture in the line of vision of one eye of the observer while the lines of vision of both eyes are in such directions that when extended they converge upon the main view and produce the effect of the supplemental picture being superposed thereon, said supplemental picture being structurally separate and independently supported to be movable and giving the appearance of movement of the supplemental object relative to the main view, and another supplemental picture placed in the line of vision of the eye observing directly the main view and being complementary to the object shown in the first-named supplemental picture to give a stereoscopic effect of the object superposed on the main view by the first-named supplemental picture.

8. Means for use with a main relatively remote picture to produce stereoscopic effects including a supplemental picture; and means for holding the same close to the observer and in the line of vision of one eye of the observer while the lines of vision of both eyes are in such directions that when extended they converge upon the main picture.

9. Means for use with a main picture to produce stereoscopic effects including a supplemental picture; means for holding the same in the line of vision of one eye of the observer while the lines of vision of both eyes are in such directions that when extended they converge upon the main picture, said supplemental picture being on a reduced scale relative to the main picture; and means for magnifying the supplemental picture to make it appear to the eye which observes it to have the same scale as the main picture.

DAVID GORDON.